(12) United States Patent
Haid

(10) Patent No.: US 12,134,532 B2
(45) Date of Patent: Nov. 5, 2024

(54) CARGO TRANSPORT VEHICLE AND CARGO LOGISTICS SYSTEM

(71) Applicant: PICK8SHIP TECHNOLOGY AG, Wallisellen (CH)

(72) Inventor: Josef A. Haid, Gockhausen (CH)

(73) Assignee: PICK8SHIP TECHNOLOGY AG, Dübendorf (CH)

( * ) Notice: Subject to any disclaimer, the term of this patent is extended or adjusted under 35 U.S.C. 154(b) by 636 days.

(21) Appl. No.: 17/292,630

(22) PCT Filed: Nov. 21, 2019

(86) PCT No.: PCT/EP2019/082019
§ 371 (c)(1),
(2) Date: May 10, 2021

(87) PCT Pub. No.: WO2020/104568
PCT Pub. Date: May 28, 2020

(65) Prior Publication Data
US 2022/0009731 A1    Jan. 13, 2022

(30) Foreign Application Priority Data
Nov. 22, 2018    (CH) ...................................... 1444/18

(51) Int. Cl.
*B60P 1/00* (2006.01)
*B60P 7/08* (2006.01)
(Continued)

(52) U.S. Cl.
CPC ................ *B65G 67/20* (2013.01); *B60P 1/00* (2013.01); *B60P 7/08* (2013.01); *G06Q 10/083* (2013.01); *B60P 1/44* (2013.01)

(58) Field of Classification Search
CPC ... B60P 1/00; B60P 7/08; B65G 67/20; G06Q 10/083
See application file for complete search history.

(56) References Cited

U.S. PATENT DOCUMENTS

| 6,106,084 A | 8/2000 | Thogersen et al. |
| 7,798,343 B2 | 9/2010 | Wang |

(Continued)

FOREIGN PATENT DOCUMENTS

| SE | 506465 C2 | 12/1997 |
| WO | 2017138377 A1 | 8/2017 |

(Continued)

OTHER PUBLICATIONS

International Search Report and Written Opinion mailed Jan. 23, 2020 for PCT/EP2019/082019.

(Continued)

*Primary Examiner* — Saul Rodriguez
*Assistant Examiner* — Willie W Berry, Jr.
(74) *Attorney, Agent, or Firm* — GrowIP Law Group LLC

(57) ABSTRACT

A cargo transport vehicle is proposed, including:
a. at least one self-supporting cargo support platform,
b. at least one mobile carrier configured to carry a cargo receptacle carrier and to move and stop between positions along the cargo support platform,
c. an electronic circuit including
  i. a command interface, and
  ii. a controller,
  wherein the command interface is configured to receive mobile carrier positioning instructions and to transmit them to the controller, the controller being configured to control the mobile carrier according to the positioning instructions.

25 Claims, 7 Drawing Sheets

(51) Int. Cl.
  *B65G 67/20*    (2006.01)
  *G06Q 10/083*   (2023.01)
  *B60P 1/44*     (2006.01)

(56) References Cited

U.S. PATENT DOCUMENTS

| | | |
|---|---|---|
| 2010/0172733 A1* | 7/2010 | Chalubert .................. A61F 4/00 |
| | | 414/730 |
| 2012/0177467 A1 | 7/2012 | Corrigan et al. |
| 2017/0225602 A1 | 8/2017 | Kevin et al. |
| 2017/0316701 A1 | 11/2017 | Gil et al. |
| 2018/0265297 A1 | 9/2018 | Nakano et al. |
| 2018/0290844 A1 | 10/2018 | Lewis et al. |
| 2018/0297781 A1* | 10/2018 | Alkhaldi ............ G06Q 30/0603 |

FOREIGN PATENT DOCUMENTS

| | | | |
|---|---|---|---|
| WO | 2017190026 A2 | 11/2017 | |
| WO | 2018187327 A1 | 10/2018 | |

OTHER PUBLICATIONS

English Translation of First Office Action for CN Application No. 201980077080.1 mailed Aug. 31, 2023 (pp. 1-10).
First Office Action for EP Application No. 19 808 572.2 mailed Feb. 28, 2023 (pp. 1-11).

* cited by examiner

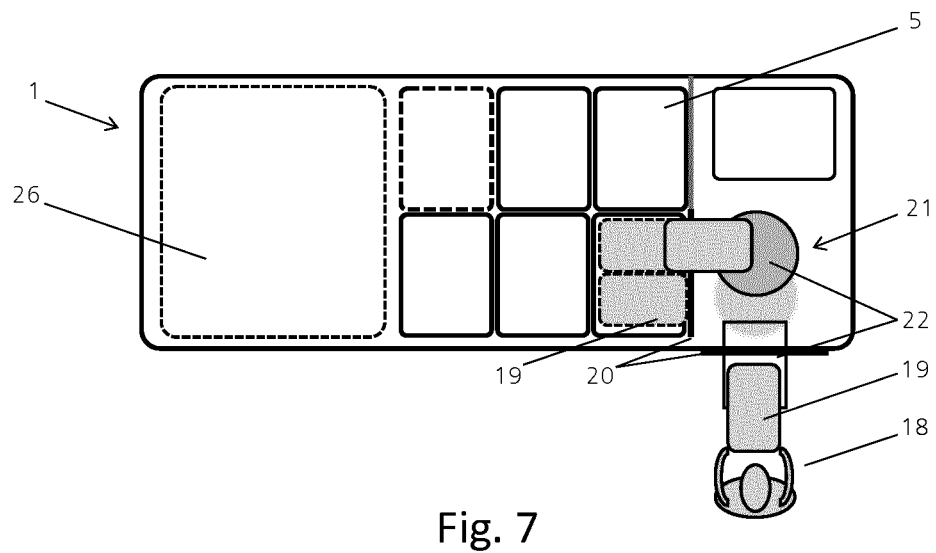
Fig. 7
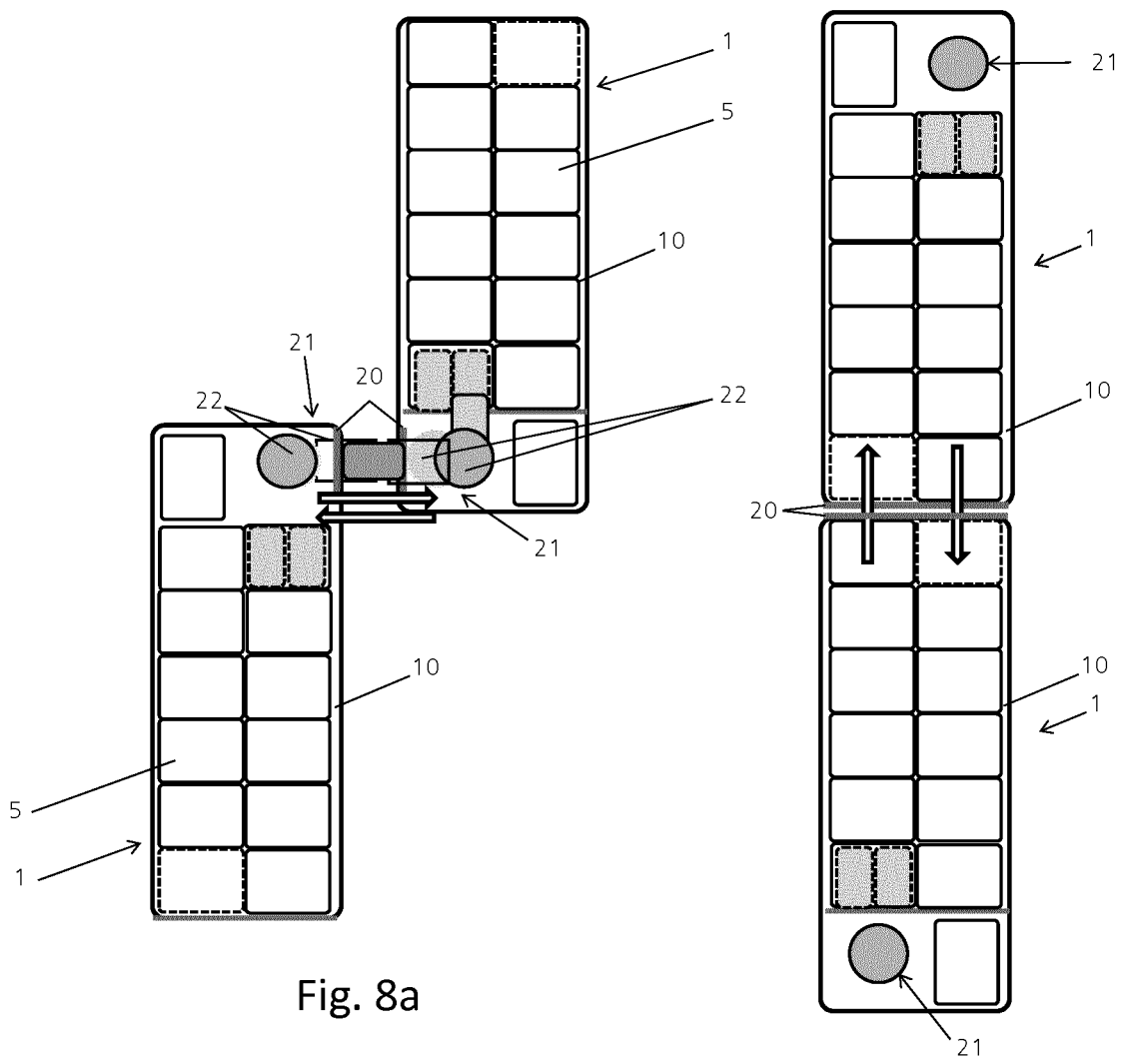
Fig. 8a
Fig. 8b

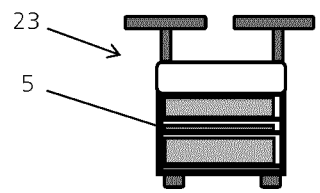
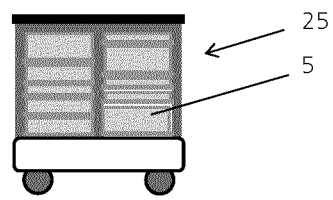
Fig. 9a      Fig. 9b
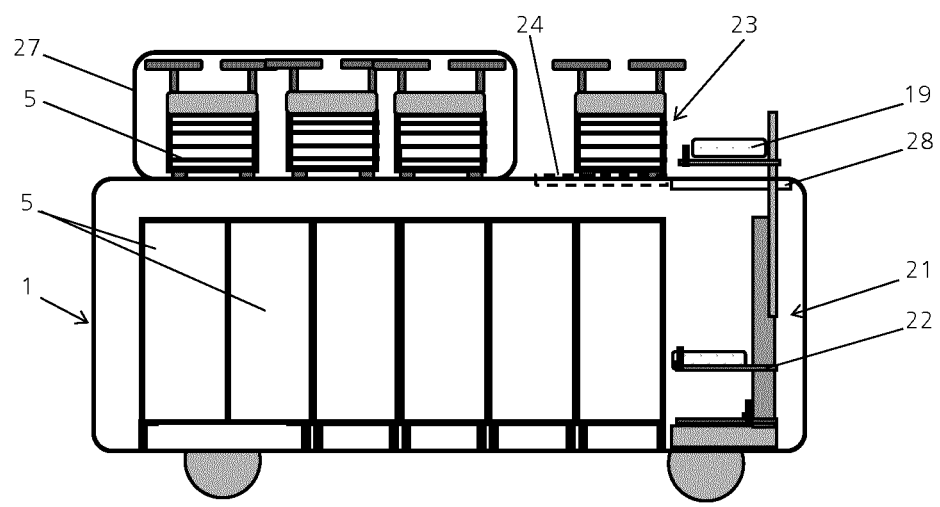
Fig. 10

CARGO TRANSPORT VEHICLE AND CARGO LOGISTICS SYSTEM

CROSS-REFERENCE TO RELATED APPLICATIONS

This application claims the benefit of the filing date of international PCT Application No. PCT/EP2019/082019, filed on Nov. 21, 2019, that in turn claims priority to Swiss Patent Application No. CH1444/18, filed on Nov. 22, 2018, the contents of which are hereby incorporated by reference in their entirety.

TECHNICAL FIELD

The present disclosure relates to a cargo transport vehicle and to a cargo logistics system according to the preamble of the patent claims.

BACKGROUND

Commerce has experienced considerable growth and improvement with respect to processes, technology, reliability and speed. However, last mile delivery methods have not changed significantly in the last 50 years, excepting the use of scanners for delivery confirmation and cargo tracking, for example. Recent growth of home delivery volumes and frequency (driven by faster delivery concepts) challenge cities and providers, for example when delivery trucks block streets and cause traffic jams. Attempts at solving this problem include local hubs to deliver cargo with electric cargo bikes, parcel lockers at post offices and super markets. In general, however, the logistics involved are still complex, inflexible, and expensive. The latter is due in part to the investments required for providing storage spaces, in particular shelf spaces for cargo used in warehouses and/or pick-up centers. Further, present cargo logistics systems logistics are not optimized for end-to-end deliveries so that customer satisfaction is limited.

WO17190026A2 discloses an unmanned aerial vehicle (UAV) pick-up and delivery system, including UAV support mechanisms such as a truck utilized to load and unload parcel carriers to the UAV chassis, whereby the UAV lands on and takes off from the truck to deliver parcels to a serviceable point.

SUMMARY

An object underlying the present disclosure is to provide an efficient and in particular scalable cargo transport vehicle along with a cargo logistics system including such a vehicle.

A cargo transport vehicle is proposed, comprising at least one self-supporting cargo support platform, at least one mobile carrier configured to carry a cargo receptacle carrier and to move and stop between positions along the cargo support platform. The cargo transport vehicle further comprises an electronic circuit comprising a command interface, and a controller, wherein the command interface is configured to receive mobile carrier positioning instructions and to transmit them to the controller, the controller being configured to control the mobile carrier according to the positioning instructions.

In a variation, the mobile carrier comprises at least one harness, the harness being configured to hold at least one cargo receptacle carrier. The harness may comprise at least one of an electronically actuatable clamp, an electronically actuatable hook, and an electronically actuatable bolt.

In a variation, the cargo transport vehicle includes a conveyor system comprising at least one transport path, the mobile carrier being configured to move along the transport path. The transport path is preferably integrated into the cargo support platform. The latter is preferably fixed, in particular to the vehicle's chassis.

The at least one transport path may comprise at least one rail, which may be fixed to the cargo support platform and project outward therefrom. In a variation, the at least one transport path comprises at least one of: a conveyor belt, a stepping conveyor, a powered roller, and a powered ball bearing. Further, the at least one transport path may comprise a groove in the cargo support platform.

Preferably, the mobile carrier comprises a pod movably mounted to the at least one transport path. The pod may comprise a communication circuit including a communication interface for communicating with the controller, preferably wirelessly. In a variation, the pod comprises a battery configured to at least partially power the mobile carrier's movement.

In a variation, the conveyor system comprises at least one electrical power line and the mobile carrier is configured to receive electrical power from the electrical power line.

In a variation, the cargo transport vehicle comprises a plurality of latches arranged along the cargo support platform, in particular integrated therein, for securing the cargo receptacle carrier at predetermined positions.

In a variation, the cargo transport vehicle comprises at least one carrier loading device configured to move a cargo receptacle carrier from the outside of the cargo transport vehicle to the inside of the cargo transport vehicle and vice versa. The at least one carrier loading device may comprise at least one of: a lifting platform, a mechanical lever, a mechanical arm, and a robotic arm. In a variation, the cargo receptacle vehicle comprises a carrier dock to and from which the carrier loading device is configured to move the cargo receptacle carrier. Preferably, the mobile carrier is configured to pick up and release, with the harness, the cargo receptacle carrier at the carrier dock.

In a variation, the cargo transport vehicle comprises at least one gateway, and a transfer station, wherein the transfer station comprises a transfer device configured to move a cargo receptacle from a cargo receptacle carrier in the cargo transport vehicle to the gateway for dispatch, and to move a cargo receptacle, delivered to the gateway, to a cargo receptacle carrier in the cargo transport vehicle. Preferably, the transfer station is accessible from within the driver's compartment and/or from the exterior of the cargo transport vehicle.

In a variation, the transfer device comprises a liftable platform configured to move the cargo receptacle to and from the gateway. For example, the transfer device may comprise a push-pull mechanism and/or at least one robotic arm configured to move the cargo receptacle to and from the gateway.

In a variation, the at least one gateway comprises or is arranged next to a landing platform for a drone. The landing platform is preferably arranged on the roof of the transport vehicle.

In a variation, the cargo transport vehicle is at least partially autonomously operable. It may comprise a GPS or other satellite communication module for position determination and navigation. The route of the cargo transport vehicle may be prescribed by a remote logistics command node, the node being situated at a fixed or mobile logistics command centre, the mobile logistics command centre including a handheld device or a device included in another cargo transport vehicle. In a variation, the cargo transport vehicle comprises an electronic circuit including sensors configured to avoid collisions and/or to autonomously park.

In an aspect, a cargo logistics system comprising a cargo transport vehicle described in this document is proposed, the cargo logistics system further comprising a cargo receptacle carrier, the cargo receptacle carrier comprising a frame comprising at least one access face suitable for insertion, carrying and removal of at least one cargo receptacle. The cargo receptacle carrier may for example comprise a system of laterally spaced-apart tracks configured to carry the at least one cargo receptacle. Preferably, the frame of the cargo receptacle carrier is of polyhedron shape. The cargo receptacle carrier may be of a size suitable for lifting by a drone or carrying by a delivery robot. In a variation, the cargo receptacle carrier comprises wheels, in which case the cargo receptacle carrier may be considered a cart or trolley. The cargo receptacle carrier may comprise insulation from the environment to protect the contents of the cargo receptacle carrier against weather and insects. The insulation may comprise a rigid housing or a soft cover. In particular, the insulation may comprise thermal insulation, in particular thermal insulation, suitable for assisting temperature maintenance of hot or cold cargo, such as produce, meals, medication or transplantable animal components, in particular organs.

In a variation, the cargo logistics system comprises a main cargo receptacle carrier according to the cargo receptacle carrier described in this document, and further comprises a plurality of cargo receptacle sub-carriers, the cargo receptacle sub-carriers having smaller dimensions than the cargo receptacle main carrier, and the cargo receptacle main carrier being configured to accommodate the cargo receptacle sub-carriers, for example by a system of parallel spaced-apart tracks as described in this document. In a variation, the cargo receptacle sub-carriers each comprise a frame designed analogous to the cargo receptacle carrier, the frame additionally comprising a mount as described in this document with respect to the cargo receptacle.

In a variation, the cargo logistics system comprises at least one drone and/or at least one delivery robot configured to pick-up a cargo receptacle, a cargo receptacle carrier, cargo receptacle main carrier and/or cargo receptacle sub-carrier from the cargo transport vehicle and autonomously deliver it to a cargo delivery destination and vice versa.

In a variation, the cargo logistics system also includes a cargo receptacle, wherein the cargo receptacle comprises a mount, a flexible member expandable and collapsible in height, comprising a first end interconnected to the mount, wherein the flexible member in an at least partially expanded state bounds a storage volume for holding cargo, and an external access to the cargo, wherein the mount is self-supporting.

The mount may comprise a frame with a rim, said rim being suitable for mounting the cargo receptacle on a system of laterally spaced-apart tracks of the cargo receptacle carrier. The mount is self-supporting to the extent that it can support its own weight and that of the flexible member attached to it without loss of structural integrity. Preferably, the mount, in particular the frame, is rigid, meaning that its shape as manufactured cannot be substantially changed without loss of structural integrity.

Advantageously, cardboard boxes or parcels can be replaced by the described cargo receptacle for holding cargo, said receptacle being suitable for easy loading onto a system of tracks for transport, for example a system of tracks in a cargo receptacle carrier or cargo receptacle cart or trolley. Because the flexible member is expandable and collapsible in height, the same cargo receptacle can be used to hold differently sized cargo. Cardboard boxes or parcels need not be individually selected and packed for transporting the cargo, leading to improved handling efficiency.

The mount, in particular its frame preferably has a polygonal outline, in particular a rectangular outline and the rim is preferably arranged at least at two sides of the frame which are preferably opposite each other. The mount, in particular the frame, may for example contain at least one material out of the group: plastic, hard plastic, steel, stainless steel, aluminium.

In a variation, the mount of the cargo receptacle includes a base plate for supporting the cargo. The volume for accommodating the cargo is in this case bounded by the flexible member and a rigid planar surface of the base plate.

In a variation, the mount of the cargo receptacle includes a tray with a base plate, a side wall surrounding the base plate at least partially and a rim, in particular flange or rim structure, extending laterally away from the side wall. The side wall and rim extending laterally therefrom are elements of the frame of the mount. In a variation, the base plate and the surrounding side wall encompass a cavity of the tray. The flexible member of the cargo receptacle is preferably fixed at its first end along the sidewall, the base plate of the tray or the rim. Preferably, the flexible member may be collapsed into the tray, in particular its cavity. Further, the flexible member may be expanded vertically beyond the limit of the side wall of the tray away from the rim.

Preferably, the cargo receptacle is re-useable, in particular may be used to carry cargo multiple times between origin and destination without losing its structural integrity.

The external access of the cargo receptacle may include at least one element selected out of the group including a sealable opening, at least one sealable flap, in particular a hard plastic flap, at least one zipper, at least one button, and at least one button press stud or hook.

In an aspect, a cargo logistics method is proposed, including loading a cargo receptacle carrier onto a cargo transport vehicle as described in this document, and instructing, via the command interface, the cargo receptacle carrier to be moved to a first position along the cargo support platform by means of the mobile carrier, the first position depending on the destination address of the cargo receptacle carrier, moving the cargo receptacle carrier, by means of the mobile carrier, to the first position, loading a second cargo receptacle carrier onto the cargo transport vehicle, instructing, via the command interface, the second cargo receptacle carrier to be moved to a second position different from the first position along the cargo support platform, the second position depending on the destination address of the second cargo receptacle carrier. The movement of the cargo receptacle carriers is preferably controlled by an electronic circuit instructed by program instructions, in particular via a command interface, as described in this document.

Preferably, the cargo receptacle carrier is moved to a gateway as described in this document, such as a front gateway opening to the driver's compartment, the cargo receptacle carrier being orientated such that an access face of the cargo receptacle carrier as described in this document is directed toward the gateway for easy retrieval and input of a cargo receptacle by service or logistics personnel directly, for example manually, or by a transfer station as described in this document.

The described cargo transport vehicle, cargo logistics system and cargo logistics method allow efficient handling and shipment not only of large, but also of small and light cargo volumes.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described invention will be more fully understood from the detailed description given herein below and the accompanying drawings which should not be considered limiting to the invention described in the appended claims. Briefly, the figures depict subject matter as follows:

FIG. 7 a schematic top view of a cargo transport vehicle comprising a front gateway with a transfer station;

FIG. 8a a schematic top view of two cargo transport vehicles each comprising a front gateway with a respective transfer station, the vehicles exchanging cargo;

FIG. 8b a schematic top view of two cargo transport vehicles each comprising a rear gateway, the vehicles exchanging cargo;

FIG. 9a a drone configured to carry a cargo receptacle carrier;

FIG. 9b a delivery robot configured to carry a cargo receptacle carrier;

FIG. 10 a cargo transport vehicle comprising a hatch, a drone bay and a drone loading port;

FIG. 11b different expansion states of the cargo receptacle according to FIG. 11a;

DETAILED DESCRIPTION

Reference will now be made in detail to certain embodiments, examples of which are illustrated in the accompanying drawings, in which some, but not all features are shown. Embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
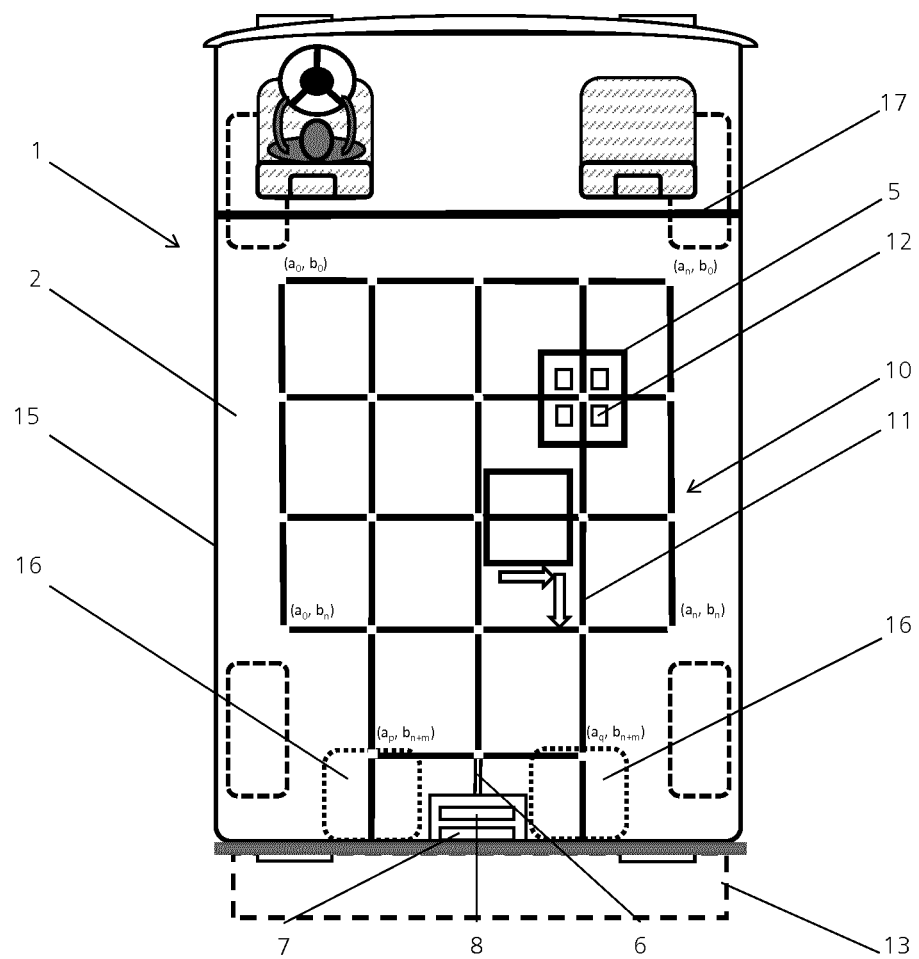
FIG. 1 a cargo transport vehicle comprising a conveyor system.

FIG. 1 is a schematic top view of a cargo transport vehicle 1 comprising a cargo support platform 2 comprised in the interior floor of the vehicle's cargo compartment. The cargo support platform 2 is self-supporting to the extent that it may support cargo receptacle carriers as described in this document filled with cargo without significant deformation. Preferably, the cargo support platform 2 comprises aluminium as its main constituent material component. The cargo support platform may comprise a plate. In particular, the cargo support platform may comprise hollowed-out structuring to reduce its weight, for example in the form of a hollowed-out honeycomb structure. Arranged in or on the plate is a conveyor system 10 comprising, in this example, a pattern, in particular a grid of transport paths 11, the transport paths comprising stepping conveyors. The stepping conveyors are shown to be separated in the same plane but are configured in sufficient close arrangement to each other that a cargo receptacle carrier 5, as described in further detail below by way of an example, can be transferred or handed over from one conveyor to another, in particular at the intersection points of the shown grid. At intersection points $(a_0, b_0)$ to $(a_n, b_n)$, a cargo receptacle carrier 5 can be carried in a different direction by means of two stepping conveyors arranged at angle to each other, and then reach its destination where it is preferably anchored by means of latches 12 provided in or on the cargo support platform. The coordinate system is indicated here with a denoting a column and b denoting a row, wherein the subscripts n, p, q and m are integers and p, q and m are greater than 0, subscript 0 indicating the first row or column. The latches 12 are preferably arranged in the immediate vicinity of an intersection of the conveyor system 10. However, in some embodiments, additional anchors or latches are provided, for example in the side walls of the vehicle 1, for securing the cargo receptacle carriers 5. The latches 12 preferably comprise harnesses configured to hold and release the cargo receptacle carriers 5 at predetermined positions in the vehicle. The harnesses may take the form of actuatable bolts and/or clamps and/or hooks configured to lock into the structure of the respective cargo receptacle carrier 5. In particular, the harnesses may be configured to harness the lower end of a cargo receptacle carrier 5, in particular its wheelbase if such is provided.

Instead of separation of the individual conveyors in the same plane at the intersection points, the conveyors may extend underneath each other at the intersection points and emerge at the surface of the cargo support platform 2, in grasping distance of a cargo receptacle carrier 5, some distance away from the intersection points. In so doing, a conveyor may extend continuously in a first direction a, and another stepping conveyor may extend continuously in a second direction b at an angle to the first direction, for example at a 90° angle in the case of a grid such as the one shown, whereby each conveyor may extend from one side of the vehicle chassis 15 to another. The conveyors are preferably arranged inside the cargo support platform 2, for example in appropriate resources or grooves. Instead of stepping conveyors, other conveyors may be incorporated into the cargo support platform 2, such as a belt conveyor in particular a belt conveyor which comprises a chain of interconnected, in particular interlocked harnesses for harnessing the structure of a cargo receptacle carrier. The belt conveyor may comprise a belt base from which a series of projections extend whereby the structure of a cargo receptacle carrier 5, such as a leg, a wheel or a pillar fits into the gap between adjacent projections of the belt conveyor. Optional conveyors include powered ball bearings or roller bars integrated in the cargo support platform 2.

Carrier docks 16 are shown on which cargo receptacle carriers 5 are placed from the outside of the vehicle 1, and from which cargo receptacle carriers 5 can be moved to a desired position within the vehicle 1, in particular at an intersection point of the conveyor system 10 where they are locked down. Similarly, cargo receptacle carriers 5 can be moved from the desired position to a carrier dock 16 for retrieval by logistics personnel, to a gateway 20 such as one described in this document of another cargo transport vehicle, and/or to a delivery robot or drone. The carrier dock 16 may comprise positioning aids such as guides or guards arranged on the cargo support platform 2.

The cargo transport vehicle 1 further comprises an electronic circuit 6 including a command interface 7 and a controller 8. In the present example, the command interface comprises a user interface that is provided at an appropriate position in the vehicle 1 out of the way of the transport paths 11 and within easy reach of logistics or service personnel. The user interface 7 may comprise an electronic screen and the graphical command interface displayed thereon. In a variation of the transport vehicle 1, however, the command interface 7 is additionally or alternatively configured to communicate directly with a remote logistics command centre, receiving operating instructions therefrom and sending status information thereto. The controller 8 comprises a processor for executing the program instructions of an installed computer program. The program instructions are configured to instruct the controller 8 to signal the conveyor system, in particular the conveyors, to carry a cargo receptacle carrier 5 between different positions in the vehicle 1. The program instructions may also be configured to instruct the controller to signal the conveyor system 10, in particular the conveyors, to harness and release a cargo receptacle carrier 5. Where a transfer station such as one described in this document is included in the cargo transport vehicle 1, the program instructions may be configured to instruct the controller to signal the conveyor system 10, in particular the conveyors, to carry a cargo receptacle carrier 5 to/from a position in the vehicle 1 next to the transfer station, at which position the cargo receptacle carrier 5 is filled with cargo receptacles 19 or at which the latter are retrieved from said cargo receptacle carrier 5. In particular, the program instructions are preferably configured to direct the movement of the cargo receptacle carriers 5 depending on the delivery destinations of the cargo receptacles 19 they carry.

The shown cargo transport vehicle 1 additionally comprises a cargo receptacle carrier loading device 13 configured to move a cargo receptacle carrier 5 from the vehicle's exterior to the interior, in particular to the carrier dock 16. The carrier loading device 13 may comprise a lifting platform operable electronically and/or hydraulically. Instead of a single lifting platform, two separate lifting platforms may be arranged adjacent to each other and each may be configured to be operated independent of each other.

The cargo transport vehicle 1 comprises a driver's compartment and a cargo compartment, preferably separated by a compartment divider 17.

Figure 2:
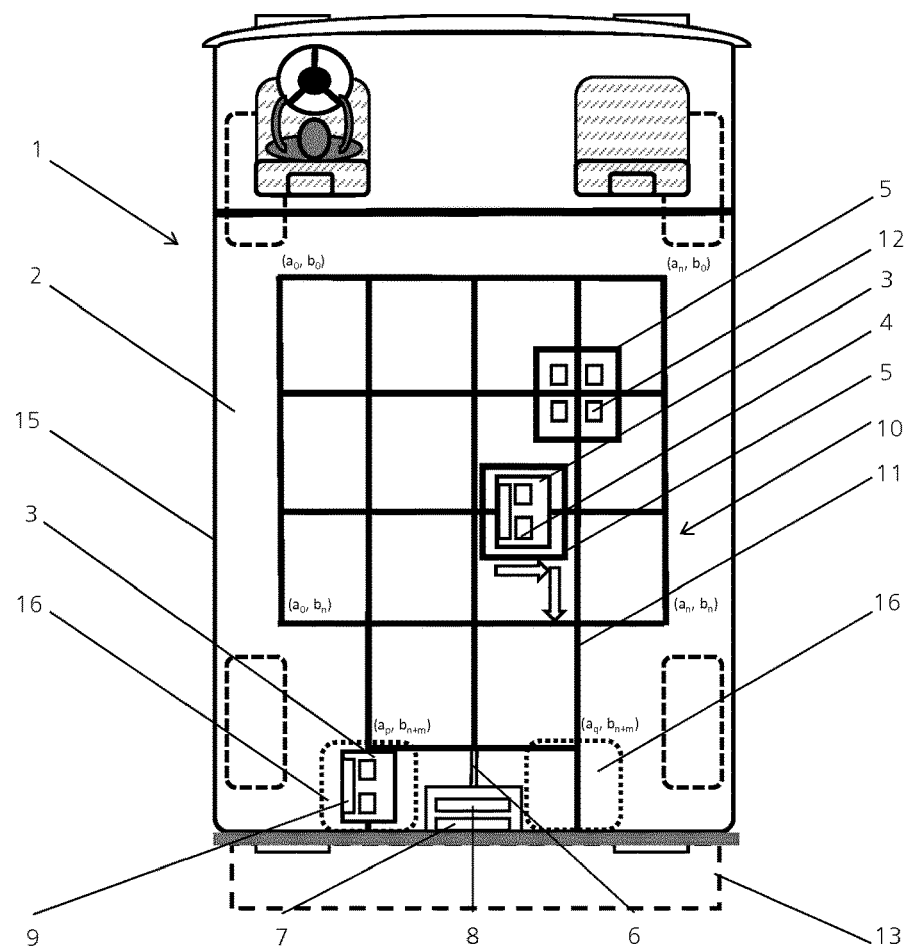
FIG. 2 a cargo transport vehicle comprising a conveyor system including pods.

FIG. 2 depicts a cargo transport vehicle 1 according to FIG. 1 with the difference that the conveyor system 10 comprises a pattern of transport paths 11 comprising grooves or rails to which at least one individual mobile carrier 3 such as a pod 3, preferably a plurality of individual pods 3, are mounted. The at least one individual mobile carrier 3 preferably comprises at least one harness 4, in particular an actuatable harness configured to hold and release a cargo receptacle carrier 5. The mobile carrier 3 therefore preferably comprises at least one actuator to actuate the harness. The at least one individual mobile carrier, in particular the pod or pods 3 may be mounted on inductive tracks or they may be mounted on rails or grooves. The mobile carrier in particular pod or pods 3 may comprise a base on which the at least one harness 4 is arranged. The harness 4 may comprise an actuatable bolt that can be raised from the base of the pod to interlock with a cargo receptacle carrier 5, or an actuatable clamp configured to harness the carrier. Alternatively, the harness 4 may comprise a platform that can be raised from the base so as to fit into an underside recess of a cargo receptacle carrier 5. When the pod 3 in this state of the raised platform has carried the cargo receptacle carrier 5 to an instructed position along the cargo support platform 2, the pod platform may be lowered down to the pod base, thereby releasing the carrier 5 and allowing the pod 3 to return to the carrier dock 16. Similarly, when the pod 3 reaches a carrier dock 16, a cargo receptacle carrier 5 may be lowered onto the pod 3 or the pod 3 may drive underneath an already placed cargo receptacle carrier 5, whereby the platform is raised from the base into the underside of the cargo receptacle carrier 5 as described above. The pods 3 are preferably configured to move along the transport paths 11 mechanically independent of one another as instructed by the computer program described in the previous example, in particular as instructed to move between different positions on the cargo support platform 2 including the carrier dock 16. The pods 3 may each comprise wheels, attached to the base of the pod, for example, which are driven by an electric motor, the wheels being configured to roll on the rails or grooves. The pods 3, in particular their bases, have a size, in particular a footprint, matching that of the cargo receptacle carrier 5, for example a footprint within the range +/−20% of the footprint of the cargo receptacle carrier 5.

The mobile carrier 3 in particular the pod or pods and their respective components such as actuators and wheels may be electrically powered. Electrical power may be provided by batteries which the mobile carriers or pods comprise, or it may be provided by electrical power lines contained in the transport paths 11, in particular in or on the grooves or rails. The mobile carriers in particular the pods 3 may each comprise a communication circuit with an interface 9 for communicating with the controller 8 of the electronic circuit 6, preferably wirelessly.

Figure 3:
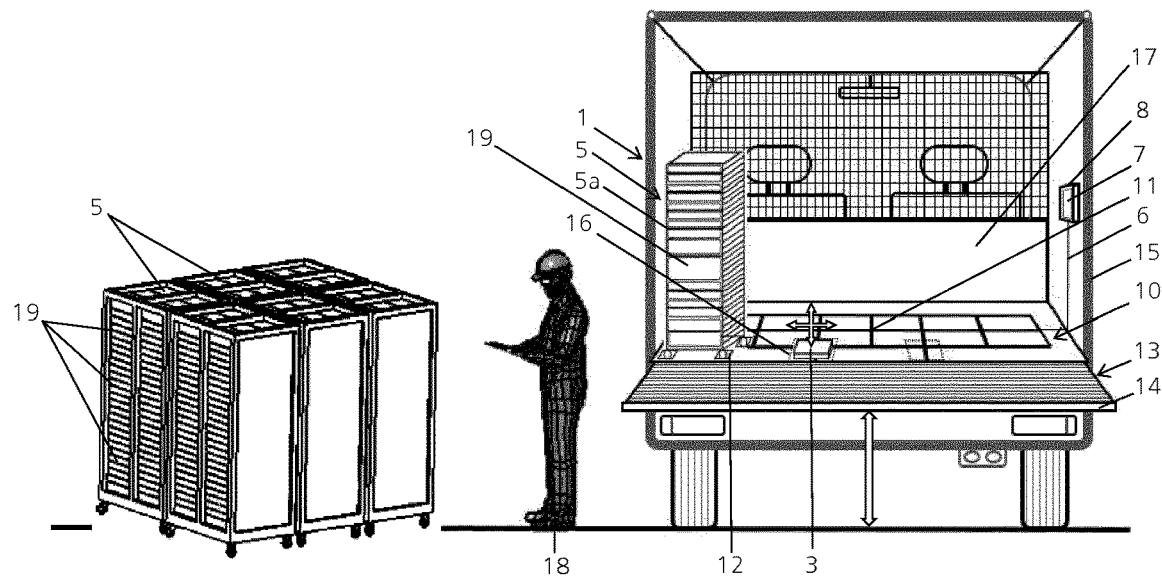
FIG. 3 a perspective view of a loading situation of the cargo transport vehicle according to FIG. 2.

FIG. 3 is a perspective view onto a cargo logistics system including a cargo transport vehicle 1 as described in this document, in particular as described in a non-limiting manner with reference to FIG. 2 and a cargo receptacle cart 5. The vehicle 1 also is shown to include the at least one mobile carrier in particular pod 3 which in this case has a rectangular footprint. Latches 12 arranged on the cargo support platform 2 are shown as recesses into which a cargo receptacle carrier 5 can be lowered, for example by means of a pod 3 has shown in this drawing or by means of a stepping conveyor or conveyor belt as described with respect to FIG. 1. Next to the vehicle 1 is an array of cargo receptacle carriers 5, of which at least one can be placed on to the carrier loading device 13 of the vehicle 1, in particular its lifting platform 14, and moved to the carrier dock 16. Moving the cargo receptacle carriers 5 onto the carrier loading device 13 may be done by logistics personnel 18 or by a drone or delivery robot as described in further detail below. An electronic circuit 6 including a command interface 7 and a controller 8 is shown mounted to the inside wall of the vehicle 1, however other positions in the vehicle 1 or on the exterior side of the vehicle 1 are possible as appropriate. Although not shown in FIGS. 1 to 3, latches or restrainers may be mounted to the inside wall of the vehicle 1 that are configured to hold cargo receptacle carriers 5 in position, and to prevent them from toppling over as the vehicle 1 moves. Such latches may be configured analogous to the latches provided on the cargo support platform 2. It should also be noted that although cargo receptacle carriers 5 have been shown to comprise wheels 5c in FIG. 3, this is not a requirement for enabling the cargo receptacle carriers 5 to be moved.

Figure 4:
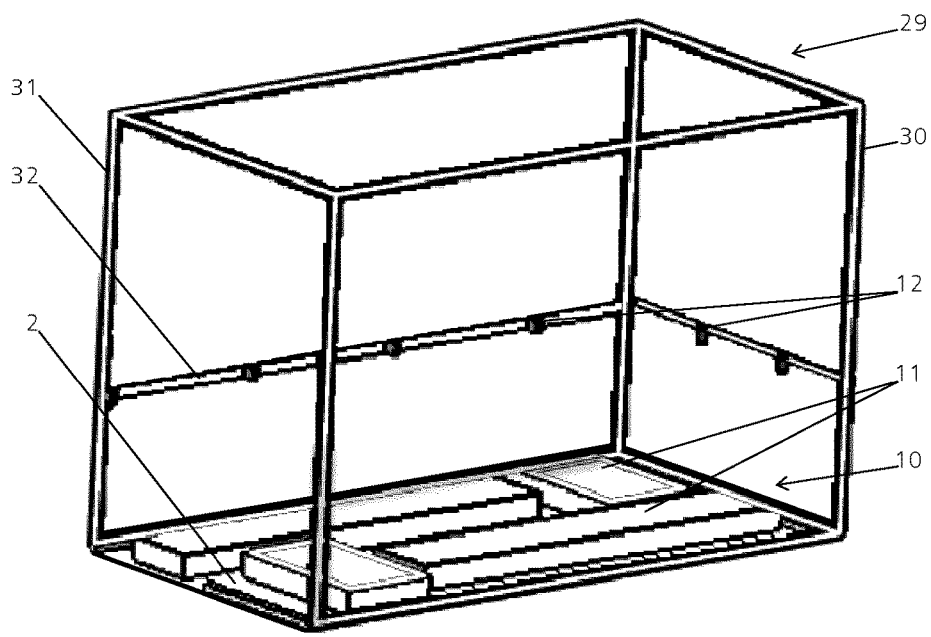
FIG. 4 a perspective view of a conveyor system module.

FIG. 4 is a schematic perspective view of a conveyor system module 29 comprising a preferably polyhedron frame 30 and a cargo support platform 2 as previously described. A conveyor system 10 is provided that may be mounted on the cargo support platform 2 as shown here or it may be integrated into the cargo support platform 2. The conveyor system 10 comprises a plurality of transport paths 11 each comprising at least one conveyor as previously described. Connecting the pillars 31 of the module frame 30 on one side is a horizontal bar 32. Alternatively, the bar 32 may be diagonal, for example connecting vertices of the frame 30. Similarly, another horizontal bar 32 connects the pillars 31 on another side of the module frame 30. Latches 12 are mounted on these bars 32 for securing cargo receptacle carts on their sides. The latches 12 preferably project into the interior of the vehicle 1 to a position vertically underneath the edge of the vehicle interior's ceiling. Where the sides of the vehicle 1 are sloped so that the surface area of the vehicle interior's ceiling is smaller than the surface area of the cargo support platform 2 and some cargo receptacle carriers 5 may therefore be positioned at a distance from the interior wall of the vehicle, the latches 12 are positioned so as to be able to latch onto these cargo receptacle carriers. The latches 12 themselves may be configured as described with respect to the preceding figures. The conveyor system module 29 is configured to be incorporated into the inside of an existing transport vehicle such as a truck or van. As in the case of the cargo support platform 2 described with reference to FIG. 1, the pillars 31 and bars 32 of the module frame 30 preferably contain aluminium as their primary constituent material component, but may additionally or alternatively contain other materials such as steel, titanium, carbon fibre.

Figure 5:
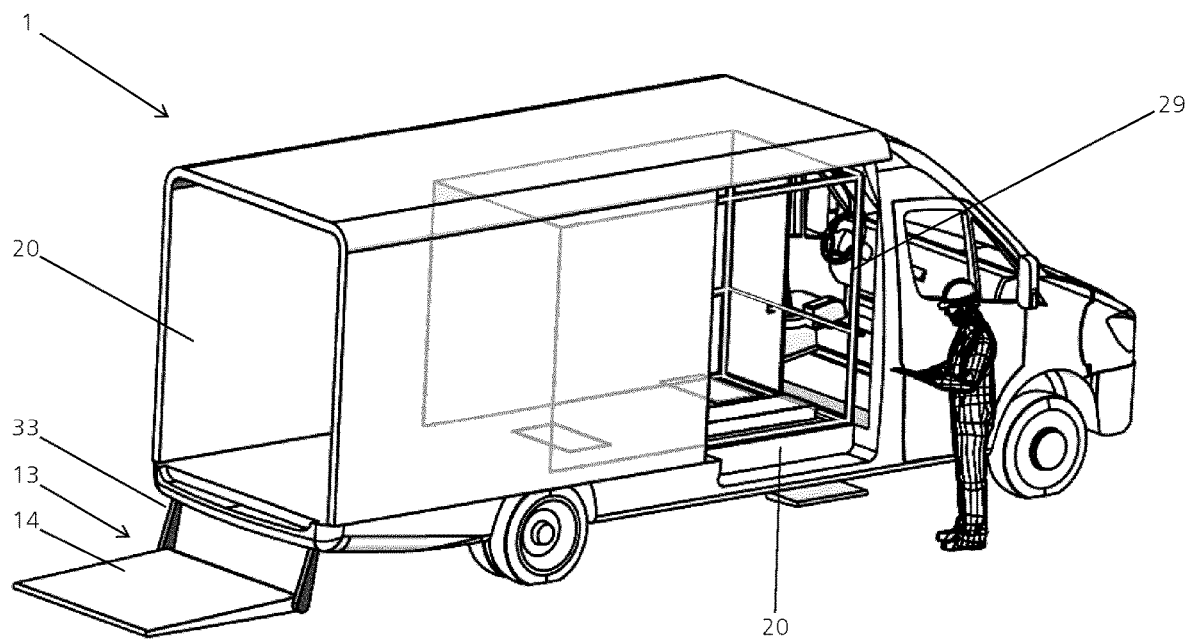
FIG. 5 a cargo transport vehicle comprising a conveyor system module according to FIG. 4.

FIG. 5 shows a cargo transport vehicle 1 comprising a conveyor system module 29 as shown in the previous figure. In addition, the cargo transport vehicle 1 is shown to comprise a carrier loading device 13 with the lifting platform 14 movably mounted to the vehicle 1 by means of a hinge mechanism 33. Further, the cargo transport vehicle 1 is shown to comprise both a rear gateway 20 and a side gateway 20. Carrier docks (not shown) as described with respect to FIG. 1 are positioned adjacent these gateways 20. A gateway 20 may comprise a door, for example a sliding door which slides sideways or it may comprise a shutter that can be raised or lowered.

Figure 6A:
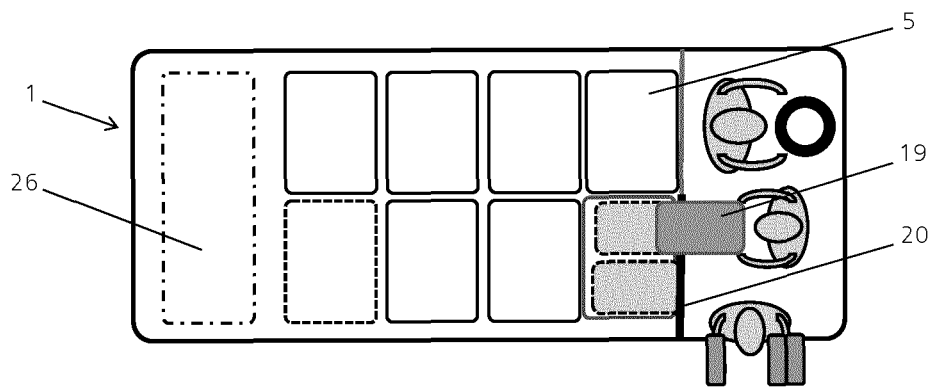
FIG. 6a a schematic top view of a cargo transport vehicle comprising a front gateway permitting access to the cargo receptacle carriers from the driver's compartment.
Figure 6B:
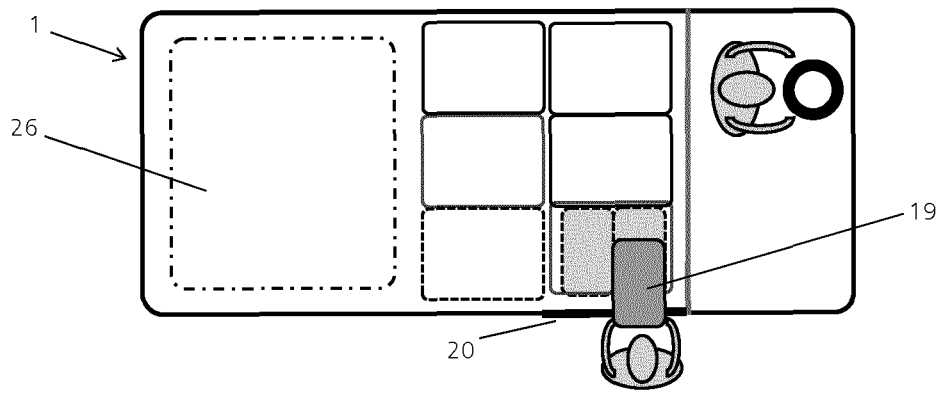
FIG. 6b a schematic top view of a cargo transport vehicle comprising a side gateway permitting access to the cargo receptacle carriers from the side exterior the vehicle.

FIG. 6a is a schematic top view of a cargo transport vehicle 1, for example a van, comprising a bulk cargo volume 26, for example a compartment for accommodating bulk cargo. The bulk cargo may be separated from the volume of the cargo compartment in which the cargo receptacle carriers 5 are arranged; in particular, the conveyor system 10, in particular its transport paths 11, are arranged next to the compartment for accommodating bulk cargo but preferably not in it. A gateway 20 for accessing cargo receptacles 19 from the carriers 5 is arranged opening to the driver's compartment, in particular opening to the front-seat passenger's side. Shown with a dashed outline is a buffer space 5e, i.e. a space on the conveyor system 10 not occupied by a cargo receptacle carrier 5, allowing shuffling of cargo receptacle carrier positions. Alternatively, such a gateway 20 may be arranged at the side of the vehicle 1 as shown in FIG. 6b for access from the exterior of the vehicle 1.

Figure 6C:
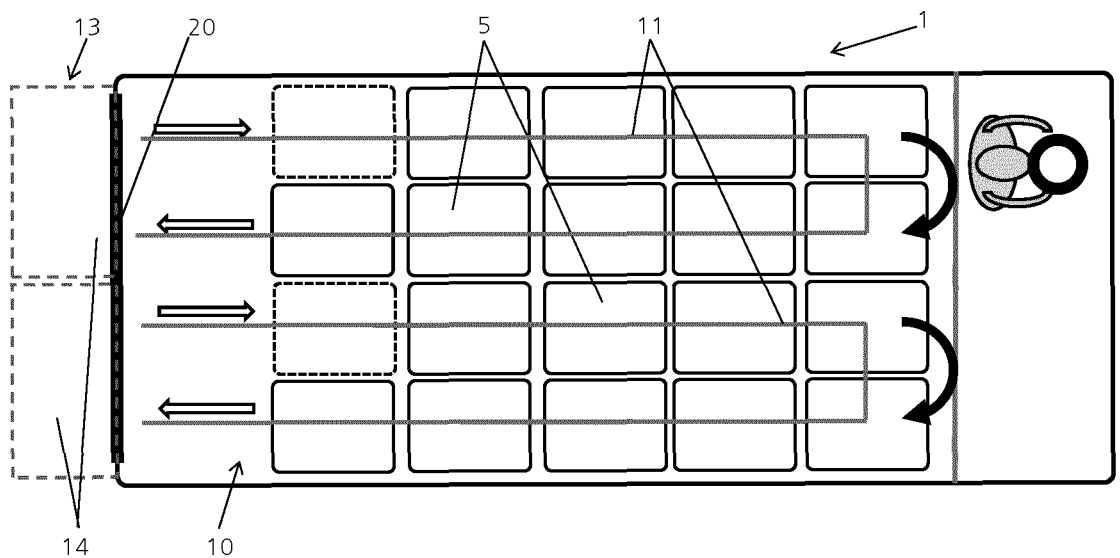
FIG. 6c a schematic top view of a cargo transport vehicle comprising a rear gateway permitting access to the cargo receptacle carriers from the rear exterior of the vehicle.

FIG. 6c shows a cargo transport vehicle 1, for example a truck, comprising a cargo compartment with two sets of transport paths 11, each transport path being a return path to and from the rear gateway 20 of the transport vehicle 1. In particular, its transport path 11 is essentially U-shaped. In the drawing, the transport paths 11 are shown to comprise 90° turns at the end of the cargo compartment adjacent the driver's compartment, however these turns may instead comprise gradual curves. The conveyor system 10 preferably comprises conveyors such as those described elsewhere in this document. Each return transport path 11 may be assigned a separate carrier loading device 13 consisting of lifting platform 14 and these may be configured to be operated independently of one another.

FIG. 7 is a schematic top view of a cargo transport vehicle 1 according to any of the previous figures additionally comprising a transfer station 21 arranged adjacent at least one gateway 20, in particular between a front gateway 20 and a side gateway 20. The transfer station 21 is configured to retrieve a cargo receptacle 19 from a cargo receptacle carrier 5 and vice versa. The transfer station 21 for example comprises a transfer device 22 including a moveable platform on which cargo receptacles, and, in some embodiments of the transfer station 21, cargo receptacle carriers 5 can be placed. The moveable platform may optionally be mounted on a lifting device and may therefore be lowered and raised. The moveable platform is preferably configured to laterally shift and/or rotate between positions next to a cargo receptacle carrier 5 and a gateway 20 opening to the exterior of the vehicle 1. In some embodiments of the transfer station 21, such as the presently depicted one, the moveable platform comprises a turntable. The transfer device 22 may also comprise push-pull devices, for example pistons, forks or grasping/holding arms, extendable and retractable trays, and/or inclinable trays, for transferring cargo receptacles 19 from a cargo receptacle carrier 5 to a gateway 20 and vice versa. The transfer station 21 is preferably controlled by the controller 8 receiving instructions from the command interface 7 of the electronic circuit 6 as shown in previous figures.

FIG. 8a shows two cargo transport vehicles 1 according to FIG. 7 docked head-to-head to one another. The transfer station 21 and transfer devices transfer cargo receptacles 19 or cargo receptacle carriers 5 to each other via front side gateways 20 as previously described.

FIG. 8b shows two cargo transport vehicles 1 according to FIG. 7 docked rear-to-rear one another. The cargo receptacle carriers 5 can be transferred to the respective other cargo transport vehicle via rear-gateways 20 directly from one conveyor system 10 to the other. In some variations, however, the cargo receptacle carriers 5 can be transferred between the conveyor systems 10 of the two vehicles indirectly via transfer stations 21 arranged at the rear of each vehicle (not shown). The transfer station 21 and transfer devices transfer cargo receptacles 19 or cargo receptacle carriers 5 to each other via front side gateways 20 as previously described.

FIG. 9a shows a drone comprising a cargo receptacle carrier 5. The cargo receptacle carrier 5 in this example has dimensions suitable to be carried, when filled with cargo, by the drone, and may be cargo receptacle sub-carrier as previously described. To that end, the cargo receptacle carrier 5 occupied with filled cargo receptacles may weigh up to 2.5 kgs, for example. As more powerful drones are put on the market, the weight limit may be greater than 2.5 kgs. For stability in the air and maneuverability, it is preferred that the height of the cargo receptacle carrier 5 does not exceed twice the height of the drone. The drone 23 comprises an electronic circuit comprising a communication interface and controller in the manner of the pod 3 described with reference to previous drawings, program instructions being received from the controller 8 of the vehicle transporter and/or from a logistics command centre.

FIG. 9b shows a delivery robot 25 for moving a suitably dimensioned cargo receptacle carrier 5, such as a cargo receptacle sub-carrier as previously described, between a cargo transport vehicle 1 disclosed in this document and a delivery destination, such as a private or company address or a sorting centre or depot of a logistics firm. The delivery robot preferably comprises a tray for receiving the cargo receptacle carrier 5 and a drive including an electric motor and wheels. The delivery robot may also comprise an electronic circuit such as one described with reference to the drone 23. In some embodiments, the delivery robot comprises a transfer device, such as a lifting platform, for raising and lower a cargo receptacle carrier 5 to and from the cargo transport vehicle 1. The delivery robot's transfer device may additionally or alternatively include at least one robotic arm configured to hold the cargo receptacle carrier 5.

FIG. 10 shows a cargo logistics system including a cargo transport vehicle according 1 to FIGS. 1 to 3 additionally comprising a transfer station 21 with a transfer device 22 including a lifting platform. The transfer device 22 comprises a push-pull mechanism as described with reference to FIGS. 7 and 8 configured to insert and extract cargo receptacles 19 to and from a cargo receptacle carrier 5 contained in the vehicle 1, in particular a cargo receptacle carrier 5 arranged next to a gateway as previously described. The transfer device 22 further includes a movable platform, such as a lifting platform and/or turntable as previously described for receiving and carrying the cargo receptacle 19, and is configured to move the moveable platform through a hatch 28, as an example of a gateway 20, provided in the roof of the vehicle 1. The cargo logistics system further comprises at least one drone 23. The transfer device 22 is further configured to move the cargo receptacle 19 from the movable platform of the transfer device to the drone 23 carrying a cargo receptacle carrier 5, the drone being positioned at a drone loading port 24 on the roof of the vehicle next to the hatch 28. Drones with at least partially unoccupied cargo receptacle carriers 5 may be temporarily housed in a drone bay 27 arranged on the roof of the cargo transport vehicle 1. The drone bay preferably comprises a housing configured to protect the drones against the environment such as wind, precipitation, dust, and insects. To arrange or queue the drones in the drone bay 27, said drone bay may comprise a drone conveyor system analogous to the conveyor system configured to move cargo receptacle carriers 5 within the vehicle's cargo compartment, although arrangement along a grid of transport paths is provided as an option since the drones may instead be arranged single-file. The drone conveyor system is configured not only to arrange, re-arrange or line up drones within the cargo bay 27, but also to move the drones to and from the drone loading port 24 within reach of the transfer device 22.

For receiving a cargo receptacle from a drone 23, the drone 23 carrying a cargo receptacle carrier 5 occupied with the cargo receptacle 19 lands on the drone loading port 24 and the cargo receptacle 19 is retrieved therefrom by means of the transfer device 22 and lowered via the hatch 28 to the cargo compartment of the vehicle 1 and then transferred to a cargo receptacle carrier 5. Similarly, instead of receiving individual cargo receptacles 19, whole cargo receptacle carriers 5 such as those described with reference to FIG. 9 may be moved between the vehicle's cargo compartment and the drone docked at the drone loading port 24 by means of the transfer device 22.

Figure 11A:
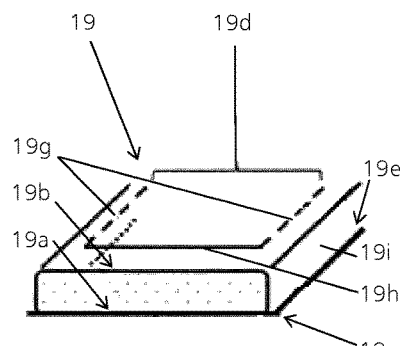
FIG. 11a a cargo receptacle with upward expandability.

FIG. 11a shows a re-usable cargo receptacle 19 comprising a self-supporting mount 19a, for example for mounting on a system of laterally spaced apart tracks of a cargo receptacle carrier 5 such as one shown in FIGS. 2 and 12, the tracks being suitable for carrying the cargo receptacle 19 between two transport positions. The mount 19a includes a ring-shaped frame having a preferably rectangular outline. The mount 19a further includes a cargo support surface, in particular a base plate extending between the external limits of the frame. The frame and preferably the cargo support surface are rigid and preferably include steel, hard plastic or a combined material containing a hard plastic and high pressure cast aluminium. A flexible member 19b is fixed with its first end 19c to the mount 19a, in particular to the frame, and bounds a storage volume for cargo. The flexible member 19b can be a vertically extendible bag fixed to the mount 19a, in particular the frame. The flexible member 19b shown here is in its first expansion state in which the skirt 19i extends vertically away from the frame by one level. In its ground state, however, the flexible member 19b may lie folded or collapsed across the mount 19a. Instead of being carried out as a bag, for example, the flexible member 19b may be realized as a flexible box. The cargo receptacle 19 is also shown and comprises an external access 19d at an end opposite the first end 19c. The external access 19d comprises a zipper system wherein two zipper lines 19g are arranged along the sides of the cargo receptacle 19, the zippers being connected to each other by a cargo receptacle zipper handle bar 19h. As the bar 19h is pulled along the zipper lines 8, for example by an automatic opening mechanism or by service personnel, access to the interior of the cargo receptacle 19 is gained. Alternatively, the external access 19d comprises flap doors, for example consisting of a hard plastic. In addition or alternatively, the external access 19d can be arranged along the surface of the skirt 19i of the flexible member 19b having a surface normal perpendicular to the collapse/expansion (vertical) direction of the cargo receptacle 19. This enables external access to the cargo receptacle 1 from the side. Instead of the zipper system, the external access 79d may comprise one or more Velcro fasteners or hooks.

An identification tag may be fixed to the mount 19a (see in particular FIG. 11c) identifying the destination and preferably contents of the cargo receptacle 19 optically and/or electronically to service personnel and/or to a machine, in particular to a robot with optical and/or electronic sensing means. For example, the identification tag may be a QR code, a barcode, or an RFID tag.

Figure 11B:
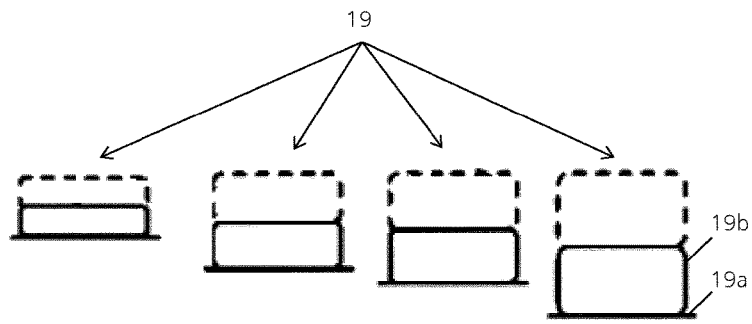

FIG. 11b shows cargo receptacles 19 with different sizes, each expandable by a factor of 2 in height. Starting from the left, the first cargo receptacle has a height of 3.5 cm expandable to 7 cm, the second cargo receptacle a height of 10.5 cm expandable to 21 cm, the third cargo receptacle a height of 14 cm expandable to 28 cm and the rightmost cargo receptacle a height of 17.5 cm expandable to 35 cm. Other sizes and expandable height factors are possible depending on a customer's needs. Preferably, the cargo receptacle 19 has the following maximum dimensions: length=55 cm, width=35 cm, height=40 cm. Preferably, the cargo receptacle 19 is sufficiently robust to repeatedly carry cargo with a weight not exceeding 25 kg.

Figure 11C:
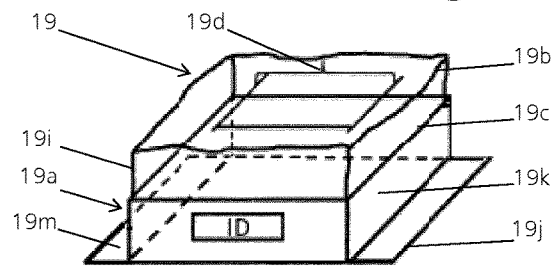
FIG. 11c a cargo receptacle comprising a tray with a base plate and flexible member.

FIG. 11c shows a cargo receptacle 19 comprising a mount 19a which includes a tray comprising a base plate 19m from which side walls 19k extend vertically and from which a rim, in particular flange or rim structure 19j extends laterally. The flange or rim structure 19j is suitable for mounting the cargo receptacle 19 on a system of spaced apart tracks 5b (see FIG. 10a). A flexible member 19b is fixed at its first end 19c to the mount 19a, preferably along multiple points of the sidewalls 19k and/or of the base plate 19m. In its ground state, the flexible member 19b is collapsed into the interior of the tray. In the first state of expansion to a first level, the flexible member 19b, extends vertically beyond the upper edge of the tray away from the flange or rim structure 19j. As previously presented, the flexible member 19b may include an external cargo access 19d and spanning elements. In addition, an identification tag may be fixed to the tray, in particular to the exterior of the sidewall or sidewalls 19k.

Figure 12A:
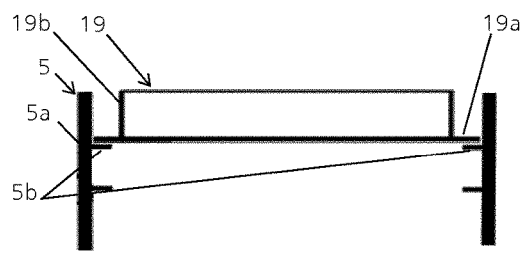
FIG. 12a a mounted state of a cargo receptacle with upward expandability.

FIG. 12a shows a cross-section of the cargo receptacle 19 mounted on a pair of laterally spaced apart tracks 5b of a cargo receptacle carrier 5. These tracks are, for example, arranged on the insides of the cargo receptacle. The mount 19a of the cargo receptacle 19 is shown to comprise a section, in particular a rim 19j, extending laterally beyond the lateral limit of the flexible member 19b. The section of the mount 19a rests on a track 5b, the mount 19a being sufficiently self-supporting to support the weight of the cargo contained in the cargo receptacle 19 without substantially compromising its structural integrity. As the flexible member 19b is expanded and its height increased, the cargo volume bounded by the flexible member 19b fits into the space between the spaced apart tracks 5b. Because one type of cargo receptacle carrier 5 and one type of cargo receptacle 19 having an adjustable height can be used for transporting variable amounts of cargo, particularly efficient sorting of cargo can be achieved with minimal usage of one-way packaging.

Figure 12B:
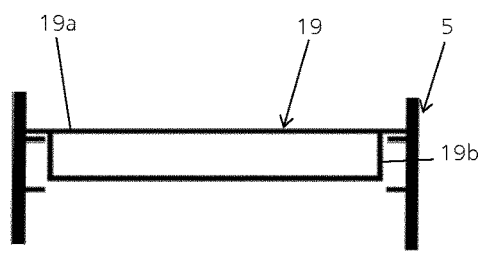
FIG. 12b a mounted state of a cargo receptacle with downward expandability.

FIG. 12b shows a cross-section of the cargo receptacle 19 shown in FIG. 10a mounted on a track 5b, wherein the flexible member 19b hangs down beyond the level of said track 5b and tracks further down if the flexible member 19b is expanded further.

Figure 12C:
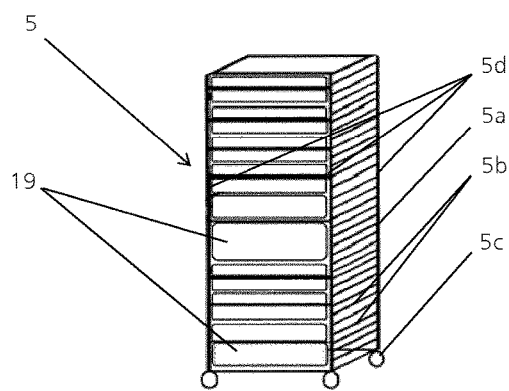
FIG. 12c a cargo receptacle carrier configured as a cart in which a plurality of cargo receptacles are accommodated.

FIG. 12c is a perspective view of a cargo receptacle carrier 5 comprising a vertical array of laterally spaced apart pairs of tracks 5b on which a number of cargo receptacles 19 are mounted, in particular cargo receptacles 19 according to the foregoing figures. The cargo receptacle carrier 5 preferably comprises a generally polyhedron-shaped carrier frame 5a, in particular as a prism with a square or rectangular cross-section or footprint. The tracks 5b extend laterally along two sides of the carrier frame that are opposite each other and connect corresponding corner pillars 5d of the carrier frame, the two opposite sides being separated from one another by at least one additional side of the carrier frame, the at least one additional side being suitable for insertion and removal of a cargo receptacle 19 into and from the cargo receptacle carrier 5.

It should be noted that not only is the cargo receptacle carrier 5 suitable for receiving and carrying cargo receptacles 19 such as those shown in FIG. 11, in some embodiments, the cargo receptacle carrier 5 is suitable to also receive a sub-carrier (not shown) of a design analogous to the shown cargo receptacle carrier 5 and which comprises a mount configured for mounting in the cargo receptacle carrier 5, for example on one of its laterally spaced apart pairs of tracks 12. The sub-carrier may have dimensions suitable for transportation by a drone and/or delivery robot as described with reference to FIGS. 9a and 9b.

This side is considered an access face of the cargo receptacle carrier. In the perspective along the longitudinal axis of the tracks, they may at least partially comprise an L-shaped cross section, the long leg of the "L" being the mounting surface on which the mount of a cargo receptacle 19 is mounted and the short leg of the "L" being the fixing surface for fixing the respective track to the carrier frame 5a, in particular to the carrier frame pillars 5d. Additional carrier frame pillars may be arranged between the two corner pillars for supporting the tracks 5b along their length (along a side of the carrier).

Wheels 5c may be provided at the bottom of the cargo receptacle carrier 5 to facilitate its displacement across the ground or surface. The cargo receptacle carrier 5 may then be considered a cargo receptacle cart. The wheels may contain a material suitable for reducing transport vibrations and noise, such as a soft rubber. In addition, the wheels may comprise locks in order to immobilize the cargo receptacle carrier 5 when transported by truck, van or other transport vehicle. Further, protectors may be arranged on the cargo receptacle carrier 5 to reduce noise during transport, for example plastic or rubber on key areas of the of the carrier subject to the strongest acoustic resonances. The cargo receptacle carrier 5 may also comprise a rounded outline or rounded extremities in order to be appropriately accommodated in curved spaces.

The cargo receptacle carrier 5 may comprise a locking bar (not shown) extending longitudinally along a side, in particular a supporting structure such as a corner pillar 5d, said locking bar including pivot means such as a hinge interconnected to the corner pillar 5d. When in a locking position, the locking bar projects into the access face of the cargo receptacle carrier 5 for insertion or removal of a cargo receptacle 19, thereby preventing removal of cargo receptacles contained in the carrier. Accordingly, when the locking bar is pivoted to an open position, the respective side of the cargo receptacle carrier 5 is unblocked and cargo receptacles 19 can be inserted into and removed from the carrier. Further the cargo receptacle carrier 5 may comprise sensors and measuring points to allow for automated storage of cargo receptacles 1.

The invention claimed is:

1. A cargo transport vehicle, comprising:
   a. at least one self-supporting cargo support platform,
   b. at least one mobile carrier configured to carry a cargo receptacle carrier and to move and stop between positions along the at least one self-supporting cargo support platform,
   c. an electronic circuit comprising
      i. a command interface, and
      ii. a controller,
   wherein the command interface is configured to receive mobile carrier positioning instructions and to transmit them to the controller, the controller being configured to control the at least one mobile carrier according to the mobile carrier positioning instructions,
   d. a gateway, and e. a transfer station, wherein the transfer station comprises a transfer device configured
  i. to move a cargo receptacle from the cargo receptacle carrier in the cargo transport vehicle to the gateway for dispatch, and
  ii. to move the cargo receptacle, delivered to the gateway, to the cargo receptacle carrier in the cargo transport vehicle.

2. The cargo transport vehicle according to claim 1, wherein the at least one mobile carrier comprises at least one harness, the at least one harness being configured to hold at least one cargo receptacle carrier.

3. The cargo transport vehicle according to claim 1, wherein the harness comprises at least one of an electronically actuatable clamp, an electronically actuatable hook, and an electronically actuatable bolt.

4. The cargo transport vehicle according to claim 1, comprising a conveyor system, the conveyor system comprising at least one transport path, the at least one mobile carrier being configured to move along the at least one transport path.

5. The cargo transport vehicle according to claim 4, wherein the at least one transport path comprises at least one rail.

6. The cargo transport vehicle according to claim 5, wherein the at least one rail is fixed to the at least one self-supporting cargo support platform and projects outward therefrom.

7. The cargo transport vehicle according to claim 4, wherein the at least one transport path comprises a groove in the at least one self-supporting cargo support platform.

8. The cargo transport vehicle according to claim 4, wherein the at least one transport path comprises at least one of: a conveyor belt, a stepping conveyor, a powered roller, and a powered ball bearing.

9. The cargo transport vehicle according to claim 4, wherein the at least one mobile carrier comprises a pod movably mounted to the at least one transport path.

10. The cargo transport vehicle according to claim 9, wherein the pod comprises a communication circuit configured to communicate with the controller.

11. The cargo transport vehicle according to claim 1, wherein a plurality of latches are arranged along the at least one self-supporting cargo support platform configured to secure the cargo receptacle carrier at predetermined positions.

12. The cargo transport vehicle according to claim 1, comprising at least one carrier loading device configured to move the cargo receptacle carrier from outside of the cargo transport vehicle to inside of the cargo transport vehicle and vice versa.

13. The cargo transport vehicle according to claim 1, wherein the at least one carrier loading device comprises at least one of: a lifting platform, a mechanical lever, a mechanical arm, and a robotic arm.

14. The cargo transport vehicle according to claim 13, comprising a carrier dock to and from which the at least one carrier loading device is configured to move the cargo receptacle carrier.

15. The cargo transport vehicle according to claim 14, wherein the at least one mobile carrier is configured to pick up and release, with the at least one harness, the cargo receptacle carrier at the carrier dock.

16. The cargo transport vehicle according to claim 1, wherein the transfer device comprises a liftable platform configured to move the cargo receptacle to and from the gateway.

17. The cargo transport vehicle according to claim 1, wherein the transfer device comprises a push-pull mechanism or at least one robotic arm configured to move the cargo receptacle to and from the gateway.

18. The cargo transport vehicle according to claim 1, wherein the transfer station is accessible via the gateway from a driver's compartment of the cargo transport vehicle or from an exterior of the cargo transport vehicle.

19. A cargo logistics system, comprising a cargo transport vehicle comprising
  a. at least one self-supporting cargo support platform,
  b. at least one mobile carrier configured to carry a cargo receptacle carrier and to move and stop between positions along the at least one self-supporting cargo support platform,
  c. an electronic circuit comprising
    i. a command interface, and
    ii. a controller,
  wherein the command interface is configured to receive mobile carrier positioning instructions and to transmit them to the controller, the controller being configured to control the at least one mobile carrier according to the mobile carrier positioning instructions,
  wherein the cargo receptacle carrier comprises a frame comprising at least one access face for insertion and removal of at least one cargo receptacle, and
  wherein the cargo receptacle carrier comprises a system of laterally spaced-apart tracks configured to carry the at least one cargo receptacle.

20. The cargo logistics system according to claim 19, comprising the at least one cargo receptacle, wherein the at least one cargo receptacle comprises:
  i. a self-supporting mount,
  ii. a flexible member expandable and collapsible in height, comprising a first end interconnected to the mount, wherein the flexible member in an at least partially expanded state bounds a storage volume for holding cargo, and
  iii. an external access to the cargo.

21. The cargo logistics system according to claim 19, wherein the at least one cargo receptacle comprises a frame with a rim, the rim being suitable for mounting the at least one cargo receptacle on the laterally spaced-apart tracks of the cargo receptacle carrier.

22. A cargo logistics system, comprising a cargo transport vehicle comprising
  a. at least one self-supporting cargo support platform,
  b. at least one mobile carrier configured to carry a cargo receptacle carrier and to move and stop between positions along the at least one self-supporting cargo support platform,
  c. an electronic circuit comprising
    i. a command interface, and
    ii. a controller,
  wherein the command interface is configured to receive mobile carrier positioning instructions and to transmit them to the controller, the controller being configured to control the at least one mobile carrier according to the mobile carrier positioning instructions,
  wherein the cargo receptacle carrier comprises a frame comprising at least one access face for insertion and removal of at least one cargo receptacle, and
  d. at least one drone or at least one delivery robot configured to pick-up a cargo receptacle or cargo receptacle carrier from the cargo transport vehicle and autonomously deliver the at least one cargo receptacle or the cargo receptacle carrier to a cargo delivery destination.

23. A cargo transport vehicle, comprising:
a. at least one self-supporting cargo support platform,
b. at least one mobile carrier configured to carry a cargo receptacle carrier and to move and stop between positions along the at least one self-supporting cargo support platform,
c. an electronic circuit comprising
   i. a command interface, and
   ii. a controller,
wherein the command interface is configured to receive mobile carrier positioning instructions and to transmit them to the controller, the controller being configured to control the at least one mobile carrier according to the mobile carrier positioning instructions, and
d. a conveyor system, the conveyor system comprising at least one transport path, the at least one mobile carrier being configured to move along the at least one transport path, wherein the at least one transport path comprises at least one of: a conveyor belt, a stepping conveyor, a powered roller, and a powered ball bearing.

24. A cargo transport vehicle, comprising:
a. at least one self-supporting cargo support platform,
b. at least one mobile carrier configured to carry a cargo receptacle carrier and to move and stop between positions along the at least one self-supporting cargo support platform,
c. an electronic circuit comprising
   i. a command interface, and
   ii. a controller,
wherein the command interface is configured to receive mobile carrier positioning instructions and to transmit them to the controller, the controller being configured to control the at least one mobile carrier according to the mobile carrier positioning instructions, and
wherein a plurality of latches are arranged along the at least one self-supporting cargo support platform configured to secure the cargo receptacle carrier at predetermined positions.

25. A cargo transport vehicle, comprising:
a. at least one self-supporting cargo support platform,
b. at least one mobile carrier configured to carry a cargo receptacle carrier and to move and stop between positions along the at least one self-supporting cargo support platform,
c. an electronic circuit comprising
   i. a command interface, and
   ii. a controller,
wherein the command interface is configured to receive mobile carrier positioning instructions and to transmit them to the controller, the controller being configured to control the at least one mobile carrier according to the mobile carrier positioning instructions, and
d. at least one carrier loading device configured to move the cargo receptacle carrier from outside of the cargo transport vehicle to inside of the cargo transport vehicle and vice versa, wherein the at least one carrier loading device comprises at least one of: a lifting platform, a mechanical lever, a mechanical arm, and a robotic arm,
e. a carrier dock to and from which the at least one carrier loading device is configured to move the cargo receptacle carrier, and wherein the at least one mobile carrier is configured to pick up and release, with the at least one harness, the cargo receptacle carrier at the carrier dock.

* * * * *